Nov. 10, 1964 H. L. HORWITZ ETAL 3,156,777
BALANCED LOCKOUT LINE CIRCUIT
Filed July 13, 1959
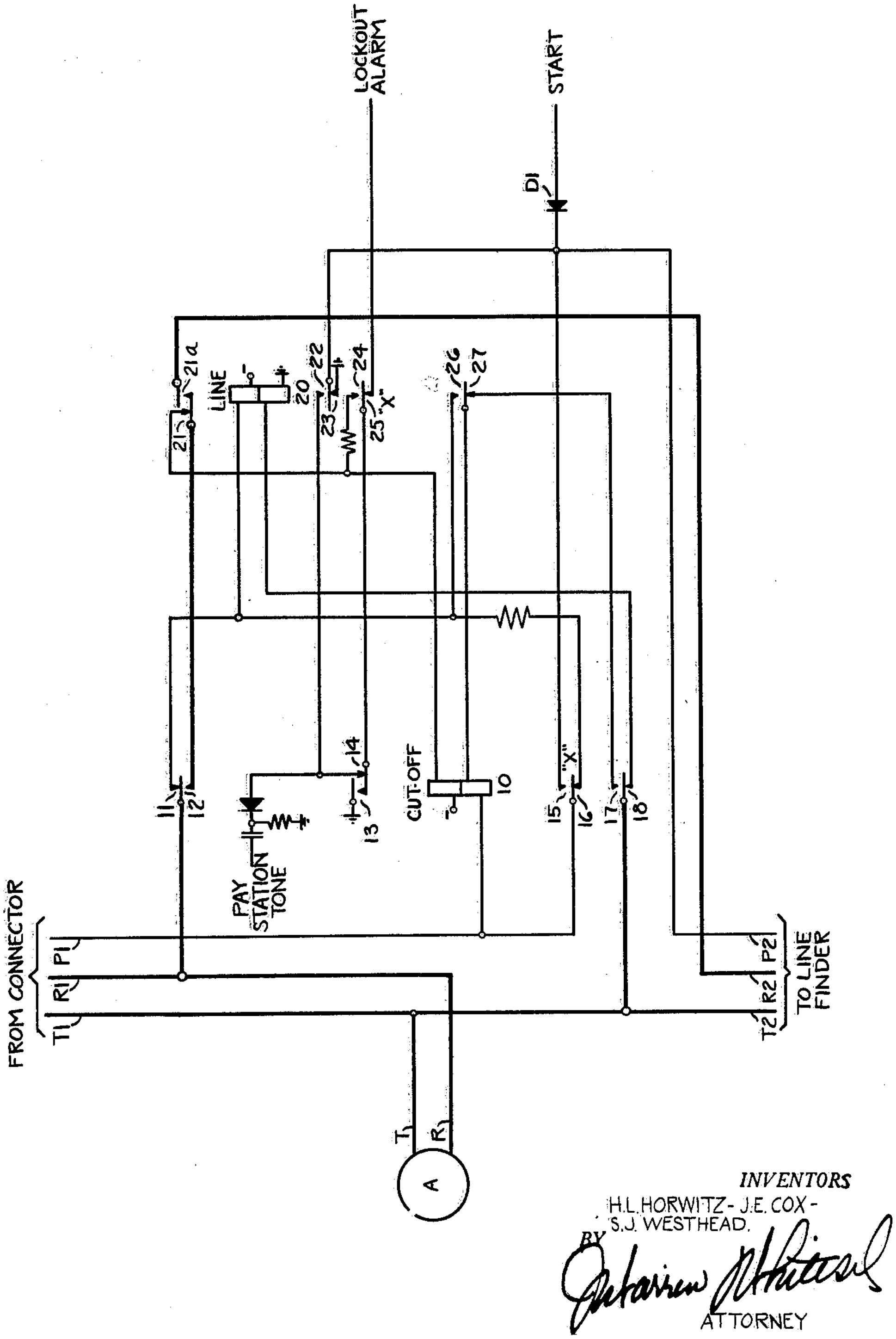
INVENTORS
H.L.HORWITZ - J.E.COX -
S.J. WESTHEAD.
BY
ATTORNEY United States Patent Office 3,156,777
Patented Nov. 10, 1964

3,156,777

BALANCED LOCKOUT LINE CIRCUIT

Henry Leopold Horwitz, Nutley, John Edward Cox, Passaic, and Stanley John Westhead, Rutherford, N.J., assignors to International Telephone and Telegraph Corporation, New York, N.Y., a corporation of Maryland Filed July 13, 1959, Ser. No. 826,571
6 Claims. (Cl. 179—18)

This invention relates to line circuits and more particularly to balanced line circuits providing lockout features.

A "line circuit" is used in telephone systems to indicate whether subscriber stations are or are not off-hook (sometimes called "hook switch supervision") and to mark idle subscriber lines as available to switching equipment. Sometimes line circuits are also adapted to provide lockout, i.e. a busy marking is applied from the line circuits to the associated subscriber lines to prevent needless operations of switching equipment in an effort to serve non-existing calls. Examples of conditions requiring lockout are: shorted tip and ring conductors, improperly replaced handsets, calls which are disconnected by conversation timing means, etc.

In the past, a first way to provide lockout has been to include an extra lockout relay in each line circuit with obvious ecnomic disadvantages. A second way in which lockout has been provided is to operate certain relays via one talking conductor and other relays via the other talking conductor. The talking conductors are unbalanced during such relay operations. A difficulty encountered in the second or unbalanced system is that noise develops on the line responsive to the unbalanced conditions resulting from connecting a relay to one side of the line without a compensating connection of another relay to the other side of the line. In some cases, the unbalanced conditions may become so acute that a line relay chatters, thus causing continuous false starts in line-finder circuits. In other cases, the noise caused by the unbalanced line may be confused with dial tone resulting in premature subscriber dialing and transmission of mutilated directory numbers.

An object of this invention is to provide new and improved line circuits.

Another object of this invention is to provide two relay line circuits including a lockout function while always maintaining an associated telephone line in a balanced condition.

In accordance with this invention, a two winding line relay is connected to supply battery to tip and ring conductors in a balanced arrangement when a calling subscriber station is off-hook before switch through and during reverting calls. On lockout, battery is furnished through a balanced connection including two windings of a cut-off relay. Thus, the tip and ring conductors are always in a balanced condition. The cut-off and line relays operate together during normal calls; however, during lockout the cut-off relay remains operated and the line relay releases.

The above mentioned and other objects of this invention together with the manner of obtaining them will become more apparent and the invention itself will be best understood, by referring to the following description of an embodiment of the invention taken in conjunction with the accompanying single sheet of drawings which shows a line circuit.

*Brief Description*

Briefly, when subscriber station A is off-hook before a linefinder switches through, a circuit may be traced from battery through the upper winding of relay 20, contacts 11, conductor R, subscriber station A, conductor T, contacts 18, and the lower winding of line relay 20 to ground. After switch-through, a marking is returned over private or sleeve conductor P2 to operate cut-off relay 10, thereby breaking the connection between line relay 20 and conductors T and R. On lockout, line relay 20 restores while cut-off relay 10 is held over a circuit which may be traced from battery through the upper winding of cut-off relay 10, contacts 21, 12, conductor R, subscriber station A, conductor T, contacts 17, 27, the lower winding of cut-off relay 10, operated contacts 15, and released contacts 23 to ground. Thus, when the line circuit supplies battery there always is balanced battery feed to conductors T and R.

*Outgoing Call*

In greater detail, when a calling subscriber at station A removes a handset or receiver, hook switch contacts (not shown) close to place a loop across conductors T and R, thereby completing a circuit which may be traced from battery through the upper winding of line relay 20, contacts 11, conductor R, station A, conductor T, contacts 18, and the lower winding of line relay 20 to ground. Thus, it should be noted that the two windings of line relay 20 provide means for applying battery potentials to an associated subscriber line via an electrically balanced circuit after off-hook supervision and before the switch-through of an associated linefinder.

When relay 20 operates, it marks the "START" conductor over a circuit which may be traced from battery through the upper winding of cut-off relay 10, operated contacts 24, rest contacts 14, operated contacts 22, and diode D1 to the conductor designated "Start." Responsive thereto, any suitable outgoing automatic switch means, such as a linefinder is started to find the conductors T2, R2, and P2. Contacts 21 and 26 have no effect at this time. Contacts 21*a* prepare a circuit for extending the talking conductors.

If an incoming call is received before a finder seizes conductors T2, R2 and P2, subscriber station A is connected over conductors T1, R1 and P1 to another subscriber station via a connector (not shown).

After associated linefinding means seizes conductors T2, R2, and P2, a ground potential is returned to operate cut-off relay 10 over a circuit including conductor P2, contacts 22, 14, 24 and the upper winding of relay 10 to battery.

Responsive to the operation of cut-off relay 10, "X" or preliminary contacts 15 close first to complete a holding circuit which may be traced from ground applied by a linefinder or selector circuit to private or sleeve conductor P2 through contacts 15, the lower winding of cut-off relay 10, operated contacts 26, and the upper winding of line relay 20 to battery. Thereafter, cut-off relay 10 opens contacts 11 and 18 to break the circuit over which line relay 20 originally operated; however, relay 20 continues to be held over its upper winding via the circuit which was just traced through the lower winding of cut-off relay 10. Contacts 12 close and complete a circuit from conductor R to conductor R2. There is no effect when contacts 17 close. Also, responsive to the operation of cut-off relay 10, contacts 13 close thereby completing a holding circuit for relay 10 which may be traced from ground through contacts 13, contacts 24, and the upper winding of cut-off relay 10 to battery.

At the end of a call, the subscriber at station A hangs-up to break the loop across conductors T and R. Responsive thereto, equipment (not shown) removes ground from conductor P2. Line relay 20 releases since its holding circuit extended from battery through its upper winding to ground on conductor P2 via contacts 26, the lower winding of relay 10 and contacts 15. Cut-off relay 10 holds briefly over a circuit extending from ground through contacts 13, 24, and the upper winding of relay 10 to battery. Note that contacts 24 are marked with an "X" to indicate that they are quick to operate and slow to release, i.e. contacts 24 remain closed for a short period of time after contacts 26 open. Since the loop across conductors T and R is now open at hook switch contacts and further since complete release of line relay 20 opens contacts 24, cut-off relay 10 releases.

*Lockout*

Next, it is assumed that there is a signal across line conductors T and R, such as an insulation fault resistance which simulates closed hook switch contacts, for example. Responsive thereto, the line circuit operates to start line finding means as described above. Dial tone is returned, in a normal manner and timer means (not shown) measures a period of time. Since it is assumed that no subscriber is placing a call, dial pulses are not sent before the expiration of a measured period of time; therefore, the timer (not shown) removes ground from private or sleeve conductor P2. Responsive thereto, a circuit is broken which previously extended from conductor P2 through contacts 15, the lower winding of cut-off relay 10, contacts 26, and the upper winding of relay 20 to battery. Cut-off relay 10 does not release at once since it is being held by its upper winding over a circuit which extends from battery through the upper winding of relay 10, operated "X" contacts 24, and contacts 13 to ground.

Line relay 20 releases and first closes its contacts which are not marked by the letter "X." Contacts 23 prepare a holding circuit for relay 10 which may be traced from ground through contacts 23, 15, the lower winding of cut-off relay 10, contacts 27, 17, conductor T, and a permanent signal fault which is in simulation of closed hook switch contacts. Thereafter, contacts 21 close and a circuit is completed from the permanent signal fault over conductor R, contacts 12, 21, and the upper winding of cut-off relay 10 to battery. There is no effect when "X" contacts 24 open to break the holding circuit through the upper winding of cut-off relay 10 since the circuit including the fault across conductors T and R which was just described has already been completed.

It should be noted that tip and ring conductors T and R are balanced electrically by ground potential extended from contacts 23 through the lower winding of cut-off relay 10 and by battery potential extended through the upper winding of relay 10.

Also responsive to release of relay 20, contacts 25 close, thus extending an alarm signal which may be traced from ground at contacts 13 through contacts 25 to the "Lockout Alarm" conductor.

Means is provided for marking the line as busy to associated linefinder and connector equipment during lockout conditions. The busy marking for the connector is ground potential which is extended from contacts 23 through contacts 15 to conductor P1 and the busy marking for the linefinder is ground potential which is extended from contacts 23 directly to conductor P2.

The line circuit is held in the condition just described until the signal simulating a calling condition is removed. For example, if the calling signal results from a subscriber at station A leaving a receiver or handset off-hook, the circuit may be broken when the receiver or handset is replaced, thus opening a loop at hook switch contacts. Thereupon, cut-off relay 10 restores.

Quite obviously, the foregoing references to an insulation fault signal and faulty receiver placement are given by way of example only. Many other conditions may exist which also cause lockout.

*Incoming Call*

The next call to be described is one which is incoming over conductors T1 and R1 from a connector bank access. Normally, any suitable incoming automatic switch means, such as a connector tests for a battery marking to indicate an idle called line, the marking being extended from battery through the upper winding of line relay 20, and contacts 16, to conductor P1. When an associated connector seizes conductors T1, R1 and P1, ground potential is forwarded from the connector over private or sleeve conductor P1 to energize the upper winding of relay 20 via contacts 16.

When relay 20 operates, contacts 26 close to complete a circuit for operating cut-off relay 10 via its lower windings over a circuit which may be traced from ground on conductor P1, through the lower winding of cut-off relay 10, contacts 26, and the upper winding of line relay 20 to battery. Cut-off relay 10 operates and opens contacts 14 thereby breaking the path which sends a start signal when a call is placed. A holding circuit for relay 10 may be traced from ground on contacts 13, through contacts 24, and the upper winding of cut-off relay 10 to battery. Line relay 20 is held operated throughout a call over a circuit extending from battery through the upper winding of relay 20, contacts 26 and the lower winding of cut-off relay 10 to ground on private or sleeve conductor P1.

At the end of a call, the connector (not shown) removes a ground marking from conductor P1, thereby releasing line relay 20. Responsive thereto, contacts 24 and 26 open to release cut-off relay 10.

Thus, it is seen that a two relay line circuit provides means for initiating an outgoing call, for terminating an incoming call, and for holding a line during lockout—and further that the line conductors T and R are always balanced, i.e. battery is furnished through the two windings of line relay 20 when subscriber station A is off-hook before switch-through and through the two windings of cut-off relay 10 during lockout.

While the principles of the invention have been described in connection with specific apparatus, it is to be clearly understood that this description is made only by way of example and not as a limitation on the scope of the invention.

We claim:

1. In a telephone system outgoing automatic switching means, incoming automatic switching means, a two-wire telephone line and a two relay line circuit connected to said telephone line comprising: means responsive to outgoing calls for transmitting call indications to start said outgoing automatic switching means; means responsive to conditions requiring lockout for connecting battery potential to said line, for marking said line busy, and for transmitting an alarm; means responsive to incoming calls for interconnecting said telephone line and said incoming automatic switching means; and means for maintaining the impedance to ground of each of said two-wires substantally equal whereby said telephone line is maintained in electrical balance at all times.

2. In a telephone system, two-wire subscriber lines, each having a two relay line circuit associated therewith, means in each of said line circuits for maintaining the impedance to ground of each of said two wires substantially equal, the last said means comprising means for connecting one of said relays to respond to signals transmitted over an associated one of said subscriber lines, means for operating said one relay responsive to the initiation of a call on said associated subscriber line, means responsive to switching said associated subscriber line through said telephone system for operating the other of said relays, means responsive to said operation of said other relay for disconnecting said one relay from said associated subscriber line and for completing a circuit for holding said one relay in an operated condition for the duration of a call and means responsive to said operation of said other relay and said holding of said one relay for completing a talking loop to said subscriber line.

3. The telephone system of claim 2 and means responsive to conditions requiring lockout for thereafter releasing said one relay and holding said other relay and means responsive to said last named means for marking said associated subscriber line as busy.

4. The telephone system of claim 3 wherein each of said relays comprises two electrically balanced windings of substantially equal impedance, and means for extending electrical potentials through said two windings of said one relay to said associated subscriber line before said operation of said other relay, and means for extending electrical potentials through said two windings of said other relay to said associated subscriber line when said line is in lockout.

5. In a telephone system, a line circuit comprising a line relay and a cut-off relay, means for controlling said line relay responsive to hook switch supervision, means for controlling said cut-off relay responsive to an extension of a call, means controlled by said cut-off relay for disconnecting said line relay from an associated two-wire subscriber line and for holding said line relay operated for the duration of a call, means responsive to conditions requiring lockout on said associated subscriber line for releasing said line relay and for connecting said cut-off relay to be controlled over said associated subscriber line and means for maintaining the impedance to ground of each of said two-wires substantially equal at all times.

6. The telephone system of claim 5 wherein each of said relays comprises two electrically balanced windings of substantially equal impedances and means for supplying electrical potentials to said associated subscriber line through said two windings of said line relay before operation of said cut-off relay and means for supplying electrical potentials to said associated subscriber line through said two windings of said cut-off relay during said conditions requiring lockout, whereby said line circuit supplies electrical potentials to said associated subscriber line via electrically balanced circuits.

References Cited in the file of this patent

UNITED STATES PATENTS

| | | |
|---|---|---|
| 2,225,305 | King et al. | Dec. 17, 1940 |
| 2,277,191 | Wilbur | Mar. 24, 1942 |
| 2,572,027 | Horwitz | Oct. 23, 1951 |
| 2,650,950 | Kessler | Sept. 1, 1953 |
| 2,876,290 | Harris | Mar. 3, 1959 |
| 2,913,529 | Jacobaeus et al. | Nov. 17, 1959 |
| 2,959,642 | Dubuar | Nov. 8, 1960 |